United States Patent
Basu Mallick et al.

(10) Patent No.: US 11,765,745 B2
(45) Date of Patent: Sep. 19, 2023

(54) TRANSMITTING INFORMATION THAT INDICATES A CHANGE IN SYSTEM INFORMATION

(71) Applicant: Lenovo (Singapore) PTE. LTD., New Tech Park (SG)

(72) Inventors: Prateek Basu Mallick, Dreieich (DE); Hyejung Jung, Northbrook, IL (US); Joachim Loehr, Wiesbaden (DE); Alexander Johann Maria Golitschek Edler von Elbwart, Darmstadt (DE); Ravi Kuchibhotla, Chicago, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/693,207

(22) Filed: Mar. 11, 2022

(65) Prior Publication Data

US 2022/0201664 A1    Jun. 23, 2022

Related U.S. Application Data

(63) Continuation of application No. 16/406,890, filed on May 8, 2019, now Pat. No. 11,297,610.
(Continued)

(51) Int. Cl.
*H04W 72/04*    (2023.01)
*H04L 5/00*    (2006.01)
(Continued)

(52) U.S. Cl.
CPC ........... *H04W 72/23* (2023.01); *H04L 5/0051* (2013.01); *H04W 72/0446* (2013.01); *H04W 72/1273* (2013.01)

(58) Field of Classification Search
None
See application file for complete search history.

(56) References Cited

U.S. PATENT DOCUMENTS

| | | | |
|---|---|---|---|
| 2011/0075621 A1* | 3/2011 | Sung | H04W 48/12 370/329 |
| 2011/0086608 A1* | 4/2011 | Yamagishi | G08B 27/006 455/404.1 |

(Continued)

OTHER PUBLICATIONS

Ericsson, "Summary of offline discussions on 7.1.3.1.4 (DCI contents and formats)", TSG-RAN WG1 #92bis R1-1805735, Apr. 16-20, 2018, pp. 1-4.

(Continued)

*Primary Examiner* — Sai Aung
(74) *Attorney, Agent, or Firm* — Kunzler Bean & Adamson

(57) ABSTRACT

Apparatuses, methods, and systems are disclosed for transmitting information that indicates a change in system information. One method includes determining a change corresponding to system information occurring after a first modification period boundary. The method includes transmitting information in downlink control information that indicates the change corresponding to the system information. The information is transmitted before a second modification period boundary, and the change comprises a modification to a master information block, a modification to a system information block, a modification to scheduling information, or some combination thereof.

20 Claims, 8 Drawing Sheets

Related U.S. Application Data

(60) Provisional application No. 62/668,711, filed on May 8, 2018.

(51) Int. Cl.
*H04W 72/23* (2023.01)
*H04W 72/0446* (2023.01)
*H04W 72/1273* (2023.01)

(56) References Cited

U.S. PATENT DOCUMENTS

| | | | | |
|---|---|---|---|---|
| 2012/0087314 | A1* | 4/2012 | Maeda | H04W 72/042 |
| | | | | 370/328 |
| 2014/0086173 | A1* | 3/2014 | Sadeghi | H04W 72/048 |
| | | | | 370/328 |
| 2016/0037491 | A1* | 2/2016 | Hwang | H04L 5/0053 |
| | | | | 370/330 |
| 2016/0242151 | A1* | 8/2016 | Seo | H04W 72/042 |
| 2016/0295345 | A1* | 10/2016 | Oh | H04W 72/042 |
| 2017/0105166 | A1* | 4/2017 | Lee | H04W 48/12 |
| 2017/0142766 | A1* | 5/2017 | Kim | H04W 48/20 |
| 2017/0164400 | A1* | 6/2017 | Fong | H04W 74/0833 |
| 2017/0367070 | A1* | 12/2017 | Zhang | H04W 48/02 |
| 2018/0124685 | A1* | 5/2018 | Jha | H04W 68/02 |
| 2018/0375619 | A1* | 12/2018 | Hwang | H04L 5/0057 |
| 2019/0124625 | A1* | 4/2019 | Takeda | H04W 4/70 |
| 2020/0305038 | A1* | 9/2020 | Tooher | H04W 74/0833 |

OTHER PUBLICATIONS

Huawei, Hisilicon—"On demand SI acquisition and failure handling," R2-1713288, 3GPP TSG-RAN WG2 Meeting #100, Reno, USA, No. 27—Dec. 1, 2017, pp. 1-8.

Oualcomm Europe—"Granularity of Information at SIB modification," R2-085587, 3GPP TSG-RAN WG2 #63bis, Sep. 29-Oct. 3, 2008, pp. 1-24.

* cited by examiner

TRANSMITTING INFORMATION THAT INDICATES A CHANGE IN SYSTEM INFORMATION

CROSS-REFERENCE TO RELATED APPLICATIONS

This application is a continuation application of U.S. patent application Ser. No. 16/406,890 filed on May 8, 2019, which claims priority to U.S. Patent Application Ser. No. 62/668,711 entitled "EFFICIENTLY READING SIB1 AFTER RECEIVING PAGING DCI INDICATING SI CHANGE" and filed on May 8, 2018 for Prateek Basu Mallick, all of which are incorporated herein by reference in their entirety.

FIELD

The subject matter disclosed herein relates generally to wireless communications and more particularly relates to transmitting information that indicates a change in system information.

BACKGROUND

The following abbreviations are herewith defined, at least some of which are referred to within the following description: Third Generation Partnership Project ("3GPP"), $4^{th}$ Generation ("4G"), $5^{th}$ Generation ("5G"), 5G System ("5GS"), Authorization Authentication ("AA"), Authorization Authentication Request ("AAR"), Positive-Acknowledgment ("ACK"), Application Function ("AF"), Aggregation Level ("AL"), Access and Mobility Management Function ("AMF"), Access Network ("AN"), Access Point ("AP"), Authentication Server Function ("AUSF"), Attribute Value Pair ("AVP"), Broadcast Control Channel ("BCCH"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Cell-Radio Network Temporary Identifier ("C-RNTI"), Carrier Aggregation ("CA"), CA Network ("CAN"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Commercial Mobile Alert Service ("CMAS"), Core Network ("CN"), Coordinated Multipoint ("CoMP"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), Evolved Node B ("eNB"), Effective Isotropic Radiated Power ("EIRP"), European Telecommunications Standards Institute ("ETSI"), Earthquake and Tsunami Warning System ("ETWS"), Evolved Packet Core ("EPC"), Evolved Packet System ("EPS"), Evolved Universal Terrestrial Access ("E-UTRA"), Evolved Universal Terrestrial Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range ("FR"), Guaranteed Bit Rate ("GBR"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Identity or Identifier ("ID"), Information Element ("IE"), International Mobile Equipment Identity ("IMEI"), IP Multimedia System ("IMS"), International Mobile Subscriber Identity ("IMSI"), International Mobile Telecommunications ("IMT"), Internet-of-Things ("IoT"), Internet Protocol ("IP"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MIME"), Multimedia Telephony ("MINITEL"), Mobile Network Operator ("MNO"), massive MTC ("mMTC"), Maximum Power Reduction ("MPR"), Multimedia Priority Service ("MPS"), Machine Type Communication ("MTC"), Multi User Shared Access ("MUSA"), Inter-CN Interface Between a 4G MME and a 5GS AMF ("N26"), Non Access Stratum ("NAS"), Narrowband ("NB"), Negative-Acknowledgment ("NACK") or ("NAK"), Network Entity ("NE"), Network Function ("NF"), Next Generation RAN ("NG-RAN"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Cover Codes ("OCC"), Orthogonal Frequency Division Multiplexing ("OFDM"), Open-Loop ("OL"), Other System Information ("OSI"), Paging-Radio Network Temporary Identifier ("P-RNTI"), P-Access-Network-Info ("PANI"), Power Angular Spectrum ("PAS"), Physical Broadcast Channel ("PBCH"), Power Control ("PC"), LTE-to-V2X Interface ("PC5"), Primary Cell ("PCell"), Policy Control Function ("PCF"), Physical Cell ID ("PCID"), Policy and Charging Rules Function ("PCRF"), Proxy-Call Session Control Function ("P-CSCF"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Packet Data Network Gateway ("PGW"), Packet Data Network Gateway-Control ("PGW-C"), Packet Data Network Gateway-User ("PGW-U"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Provisional Response Acknowledgement ("PRACK"), Physical Resource Block ("PRB"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Random Access-Radio Network Temporary Identifier ("RA-RNTI"), Registration Area ("RA"), Radio Access Network ("RAN"), Radio Access Technology ("RAT"), Random Access Procedure ("RACH"), Random Access Response ("RAR"), Resource Element Group ("REG"), Radio Frequency ("RF"), Radio Link Control ("RLC"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), System Information-Radio Network Temporary Identifier ("SI-RNTI"), Serving-Call Session Control Function ("S-CSCF"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Session Description Protocol ("SDP"), Service Data Unit ("SDU"), Serving Gateway ("SGW"), System Information ("SI"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Session Initiation Protocol ("SIP"), Service Level Agreement ("SLA"), Session Management ("SM"), Session Management Function ("SMF"), Special Cell ("SpCell"), Single Network Slice Selection Assistance Information ("S-NSSAI"), Shortened TTI ("sTTI"), Synchronization Signal ("SS"), Synchronization Signal Block ("SSB"), Supplementary Uplink ("SUL"), Subscriber Permanent Identifier ("SUPI"), Temporary Cell-Radio Network Temporary Identifier ("TC-RNTI"), Tracking Area ("TA"), TA Indicator ("TAI"), TA Update ("TAU"), Transport Block ("TB"), Transport Block Size ("TBS"), Time-Division Duplex ("TDD"), Time Division Multiplex ("TDM"), Time Division Orthogonal Cover Code ("TD-OCC"), Tunnel Endpoint Identifier ("TEID"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), User Plane Function ("UPF"), Uplink Pilot Time Slot ("UpPTS"), Ultra-reliability and Low-latency Communications ("URLLC"), UE Route Selection Policy ("URSP"), LTE Radio Interface ("Uu"), Vehicle-To-Everything ("V2X"), Visiting AMF ("vAMF"), Visiting NSSF ("vNSSF"), Visiting PLMN ("VPLMN"), Interconnecting Interface ("X2") ("Xn"), and Worldwide Interoperability for Microwave Access ("WiMAX").

In certain wireless communications networks, system information may be changed. In such networks, the time to acquire the system information may be longer than desired.

BRIEF SUMMARY

Methods for transmitting information that indicates a change in system information are disclosed. Apparatuses and systems also perform the functions of the apparatus. One embodiment of a method includes determining a change corresponding to system information occurring after a first modification period boundary. In certain embodiments, the method includes transmitting information in downlink control information that indicates the change corresponding to the system information. In such embodiments, the information is transmitted before a second modification period boundary, and the change comprises a modification to a master information block, a modification to a system information block, a modification to scheduling information, or some combination thereof.

One apparatus for transmitting information that indicates a change in system information includes a processor that determines a change corresponding to system information occurring after a first modification period boundary. In some embodiments, the apparatus includes a transmitter that transmits information in downlink control information that indicates the change corresponding to the system information. In such embodiments, the information is transmitted before a second modification period boundary, and the change comprises a modification to a master information block, a modification to a system information block, a modification to scheduling information, or some combination thereof.

One method for receiving information that indicates a change in system information includes receiving information in downlink control information that indicates a change corresponding to system information. In such an embodiment, the change corresponding to the system information occurs after a first modification period boundary, the information is received before a second modification period boundary, and the change comprises a modification to a master information block, a modification to a system information block, a modification to scheduling information, or some combination thereof.

One apparatus for receiving information that indicates a change in system information includes a receiver that receives information in downlink control information that indicates a change corresponding to system information. In such an embodiment, the change corresponding to the system information occurs after a first modification period boundary, the information is received before a second modification period boundary, and the change comprises a modification to a master information block, a modification to a system information block, a modification to scheduling information, or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
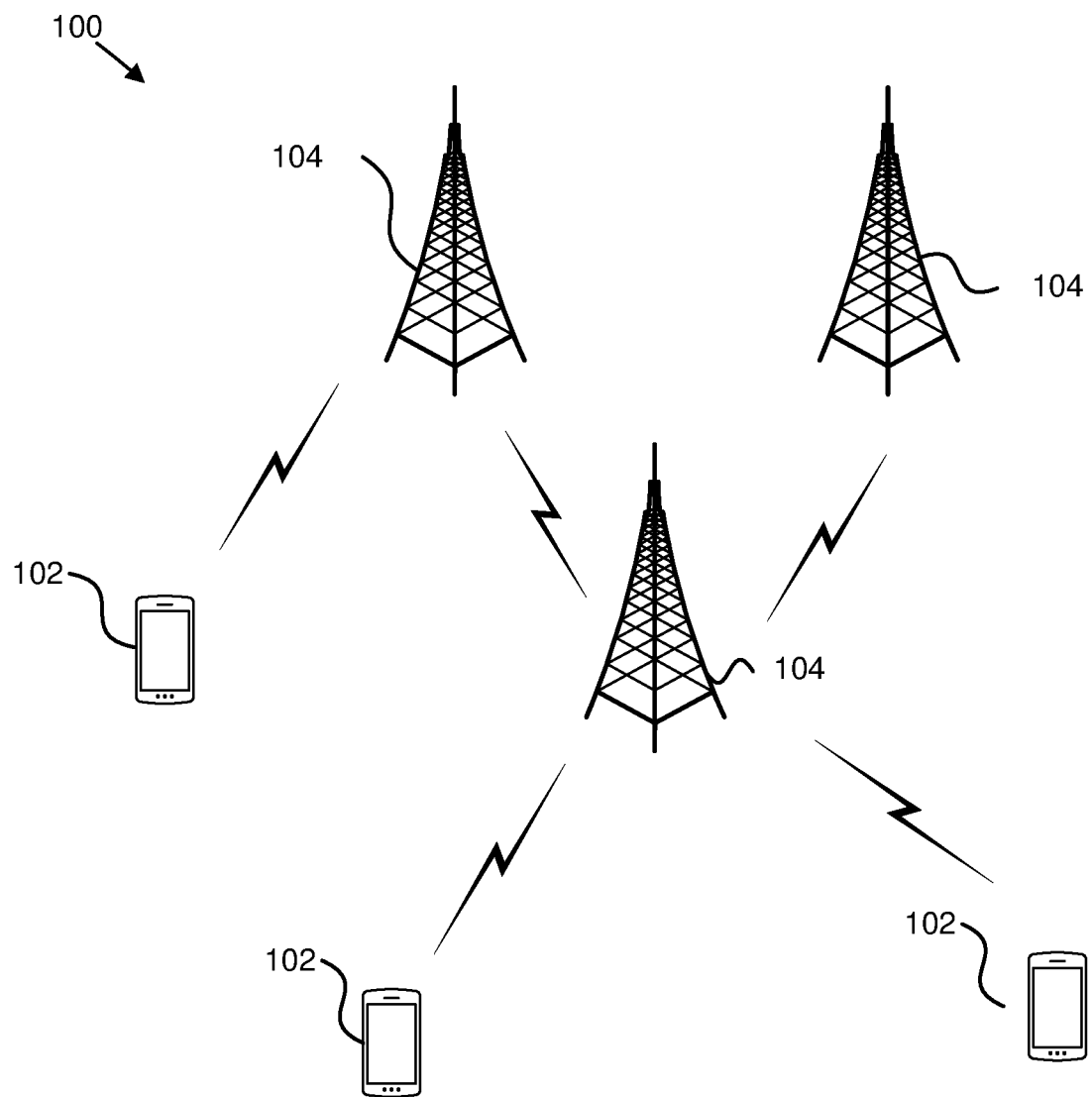
FIG. 1 is a schematic block diagram illustrating one embodiment of a wireless communication system for transmitting and/or receiving information that indicates a change in system information.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving information that indicates a change in system information. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a network unit 104 may determine a change corresponding to system information occurring after a first modification period boundary. In certain embodiments, the network unit 104 may transmit information in downlink control information that indicates the change corresponding to the system information. In such embodiments, the information is transmitted before a second modification period boundary, and the change comprises a modification to a master information block, a modification to a system information block, a modification to scheduling information, or some combination thereof. Accordingly, the network unit 104 may be used for transmitting information that indicates a change in system information.

In certain embodiments, a remote unit 102 may receive information in downlink control information that indicates a change corresponding to system information. In such an embodiment, the change corresponding to the system information occurs after a first modification period boundary, the information is received before a second modification period boundary, and the change comprises a modification to a master information block, a modification to a system information block, a modification to scheduling information, or some combination thereof. Accordingly, the remote unit 102 may be used for receiving information that indicates a change in system information.

Figure 2:
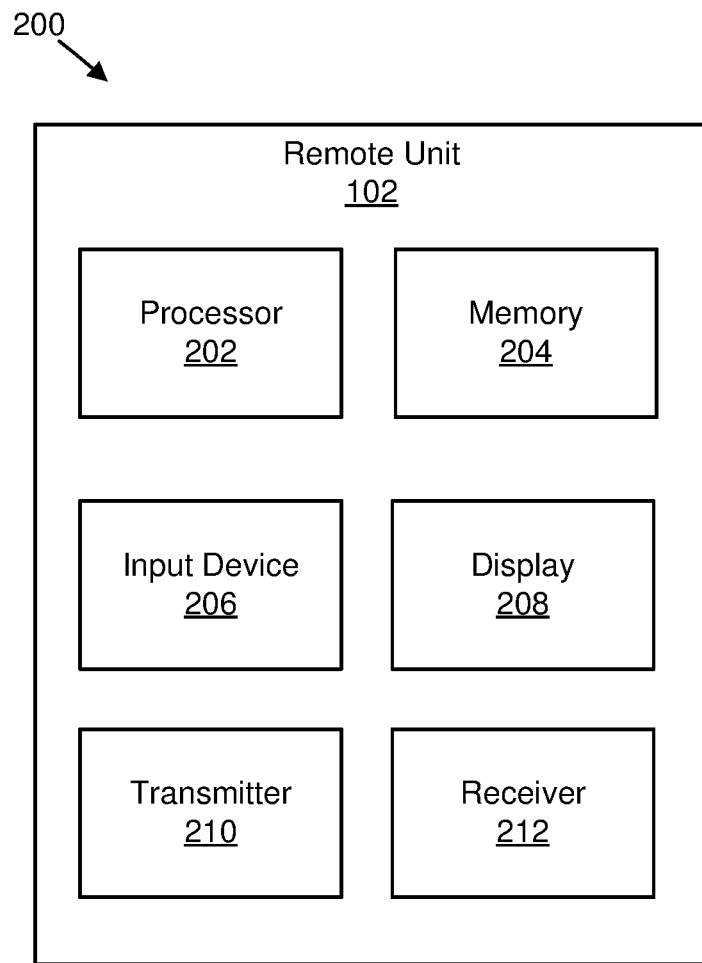
FIG. 2 is a schematic block diagram illustrating one embodiment of an apparatus that may be used for receiving information that indicates a change in system information.

FIG. 2 depicts one embodiment of an apparatus 200 that may be used for receiving information that indicates a change in system information. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In various embodiments, the receiver 212 receives information in downlink control information that indicates a change corresponding to system information. In such embodiments, the change corresponding to the system information occurs after a first modification period boundary, the information is received before a second modification period boundary, and the change comprises a modification to a master information block, a modification to a system information block, a modification to scheduling information, or some combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
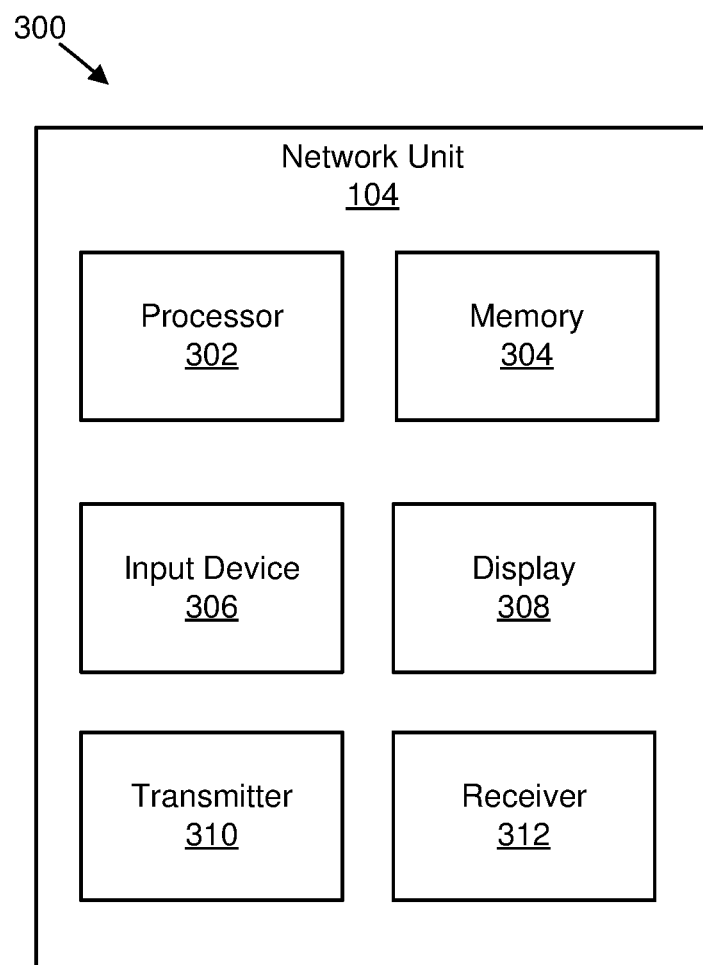
FIG. 3 is a schematic block diagram illustrating one embodiment of an apparatus that may be used for transmitting information that indicates a change in system information.

FIG. 3 depicts one embodiment of an apparatus 300 that may be used for transmitting information that indicates a change in system information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the processor 302 determines a change corresponding to system information occurring after a first modification period boundary. In some embodiments, the transmitter 310 transmits information in downlink control information that indicates the change corresponding to the system information. In such embodiments, the information is transmitted before a second modification period boundary, and the change comprises a modification to a master information block, a modification to a system information block, a modification to scheduling information, or some combination thereof.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, a paging procedure may be used to indicate to UEs system information that has changed (e.g., in paging DCI). Upon receiving such an indication in the paging DCI, UEs may acquire changed system information in a next modification period (e.g., BCCH modification period illustrated in FIG. 4, immediately after a current modification period has ended).

Figure 4:
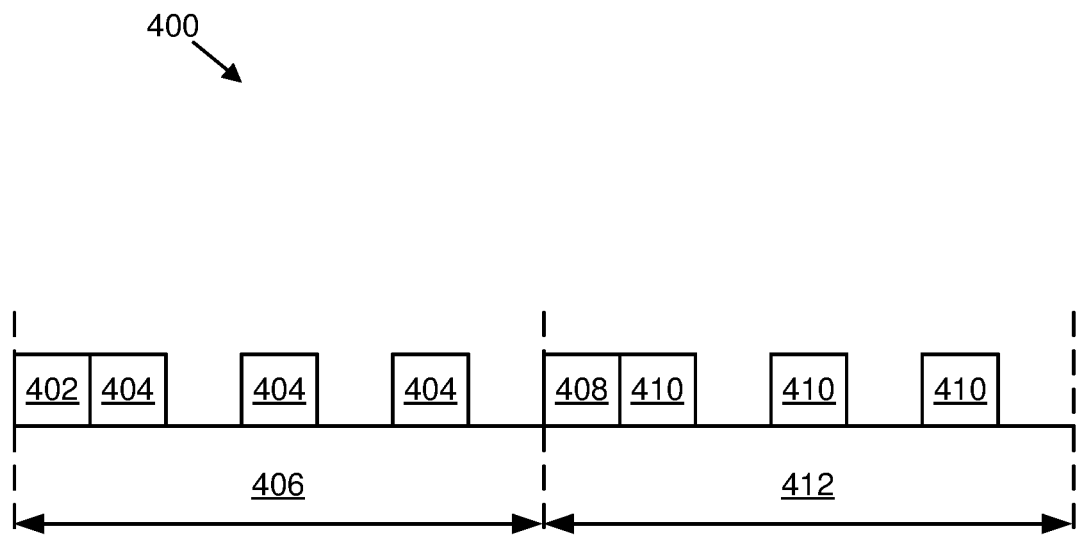
FIG. 4 is a schematic block diagram illustrating one embodiment of communications including transmitting information that indicates a change in system information.

FIG. 4 is a schematic block diagram illustrating one embodiment of communications 400 including transmitting information that indicates a change in system information. The communications 400 include a first paging DCI 402 that may include information indicating that system information has changed. The communications 400 also include transmitting unchanged system information 404. The first paging DCI 402 and the unchanged system information 404 are transmitted within a first modification period 406. The communications 400 also include a second paging DCI 408 that may include information indicating that system information has changed. The communications 400 also include transmitting changed system information 410. The second paging DCI 408 and the changed system information 410 are transmitted within a second modification period 412. The second modification period 412 is the next modification period relative to the first modification period 410 if the first modification period 410 is a current modification period.

In some embodiments, a paging procedure may indicate to UEs that warning messages (e.g., CMAS, ETWS) are being broadcasted or that an updated version of these warning messages are being broadcasted (e.g., in paging DCI). Upon receiving such an indication, UEs may acquire changed system information immediately due to an urgency of these warning messages. In such embodiments, the UE may not wait until the start of a next modification period to acquire the warning messages. As may be appreciated, warning messages may be only one example of a message that could use urgent attention and not wait until a next modification period to acquire such messages.

In certain embodiments, information about exactly which system information (e.g., SIBs or SI-messages) has changed and corresponding scheduling information may be broadcast in SIB1. In such embodiments, UEs may acquire SIB1 to get this information. In various embodiments, to acquire SIB1, a UE may need to first acquire a MIB therefore increases a total acquisition time and processing required to update system information. As may be appreciated, SIB1 may contain scheduling information for other SIBs, and the scheduling information for SIB1 may be contained in the MIB.

In some embodiments, if a valid DCI with P-RNTI is detected, fields present in the DCI may be predetermined. Certain fields in the DCI may be used to provide information to UEs corresponding to system information that has changed. For example, if the predetermined fields include a short message field, the short message may be used to signal information to the UE to facilitate efficiently reading SIB1 after receiving paging information indicating a SI change.

Figure 5:
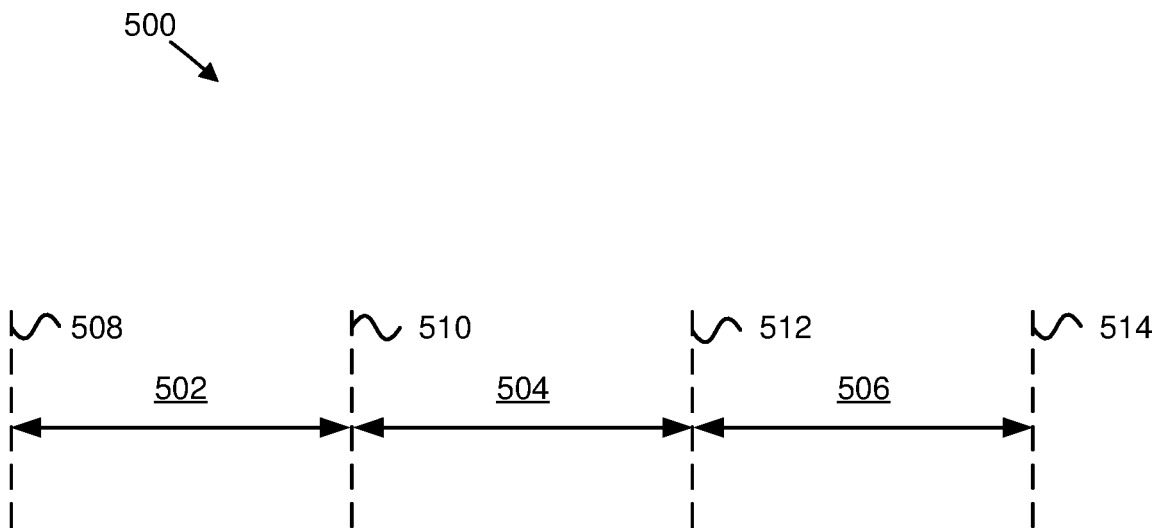
FIG. 5 is a schematic block diagram illustrating one embodiment of modification periods.

FIG. 5 is a schematic block diagram illustrating one embodiment of modification periods 500. The modification periods 500 include a first modification period 502 (e.g., n−1, a prior modification period), a second modification period 504 (e.g., n, a current modification period), and a third modification period 506 (e.g., n+1, a next modification period). The first modification period 502 is defined as the time between a first modification period boundary 508 and a second modification period boundary 510, the second modification period 504 is defined as the time between the second modification period boundary 510 and a third modification period boundary 512, and the third modification period 506 is defined as the time between the third modification period boundary 512 and a fourth modification period boundary 514.

In one embodiment, a short message field in paging DCI (or other indicator) may indicate if the MIB has been modified since a previous modification period (e.g., the first modification period 502). In such an embodiment, the short message field may include a 1 bit Boolean field labeled "MIB-changed." For example, if MIB-changed=True; then a UE may acquire the MIB again from a broadcast channel (e.g. PBCH). Moreover, if MIB-changed=False; then a UE that has acquired MIB or maintained a valid version of the MIB in the first modification period 502 may assume that the same content of MIB used to acquire SIB1 is still applicable. In certain embodiments, a value of other parameters (e.g., SFN) not affecting SIB1 acquisition may have changed. As may be appreciated, it may be possible that a UE did not acquire the MIB in the first modification period 502 because either there was no paging DCI received or because none of the received paging DCI indicated an MIB change at least with respect to parameters required for SIB1 acquisition (e.g., described in TS 38.331).

In certain embodiments, a short message field in paging DCI (or other indicator) may indicate if scheduling information (e.g., SI-SchedulingInfo as described in TS 38.331) in SIB1 has been modified since the previous modification period (e.g., the first modification period 502). The scheduling information may include a mapping of SIBs to SI-messages and/or other information related to the acquisition of a SIBs (e.g., from an SIBs corresponding SI-message). In such an embodiment, the short message field may include a 1 bit Boolean field labeled "scheduling-Info-changed" as part of the short message. For example, if scheduling-Info-changed=True; then a UE may acquire the SIB1 again from a broadcast channel (e.g., SIB1 from BCCH). Moreover, if scheduling-Info-changed=False; then a UE that has acquired SIB1; or has maintained a valid version of SIB1 in the first modification period 502 may assume that at least the scheduling information is still applicable. In certain embodiments, a value of other parameters not affecting scheduling information may have changed. As may be appreciated, it may be possible that a UE did not acquire the SIB1 in the first modification period 502, but the SIB1 may be unchanged compared with the a modification period prior to the first modification period 502 (e.g., n−2) based on a similar paging indication of scheduling-Info-changed received in the first modification period 502, and so forth. In some embodiments, a network may set scheduling-Info-changed=True even if there is no change in scheduling information for SI messages but the network would like the UE to acquire SIB1 for other reasons (e.g., such as if other important information in SIB1 has changed such as cell access or access barring related parameters).

In certain embodiments, one of the following may also be indicated as part of the short message field in paging DCI: 1) a new applicable value tag for each SIB or SI-message (the SIBs or SI-messages that are not being changed and/or updated may have the same value tag as previously in the first modification period 502 and for others the value of the value tag will be incremented); 2) information on which SIBs or SI-messages are being updated with respect to their content in the first previous modification period 502 (this can be done using a bitmap where each bit of the bitmap represents SIBs or SI-messages starting with SIB1, SIB2, or a corresponding SI-message. The bit in the bitmap may be turned on (e.g., set to 1) if the corresponding SIB or SI-message is being updated).

In various embodiments, a UE may determine if any of the SIBs or SI-messages being updated are of interest to the UE and, if any of the SIBs or SI messages are of interest to the UE and if scheduling-Info-changed=False, the UE may proceed with using stored scheduling information for the corresponding SIBs or SI-messages and acquire the corresponding SIBs or SI-messages. If, however, scheduling-Info-changed=True, the UE may reacquire SIB1. In certain embodiments, such as for on-demand system information, the scheduling-Info-changed field may guarantee to the UE that all information (e.g., PRACH resources including preamble) required to send out a SI-request remains the same as in the first modification period 502.

In some embodiments, a short message field in paging DCI (or other indicator) may indicate certain necessary information from MIB (e.g., only the information required to acquire SIB1). In such embodiments, the information may contain one or more of: subCarrierSpacingCommon, dmrs-TypeA-Position, ssb-SubcarrierOffset, and pdcch-ConfigSIB1 from MIB (e.g., described in TS 38.331).

In certain embodiments, if scheduling information has changed (e.g., indicated using scheduling-Info-changed=TRUE), then the next bits in the short message field may contain information from MIB required to receive SIB1. In such embodiments, if the scheduling information has not changed (e.g., indicated using scheduling-Info-changed=FALSE), then the next bits in the short message field may indicate exactly which SIBs or SI-messages have been modified and/or updated, as illustrated in FIG. 6.

Figure 6:
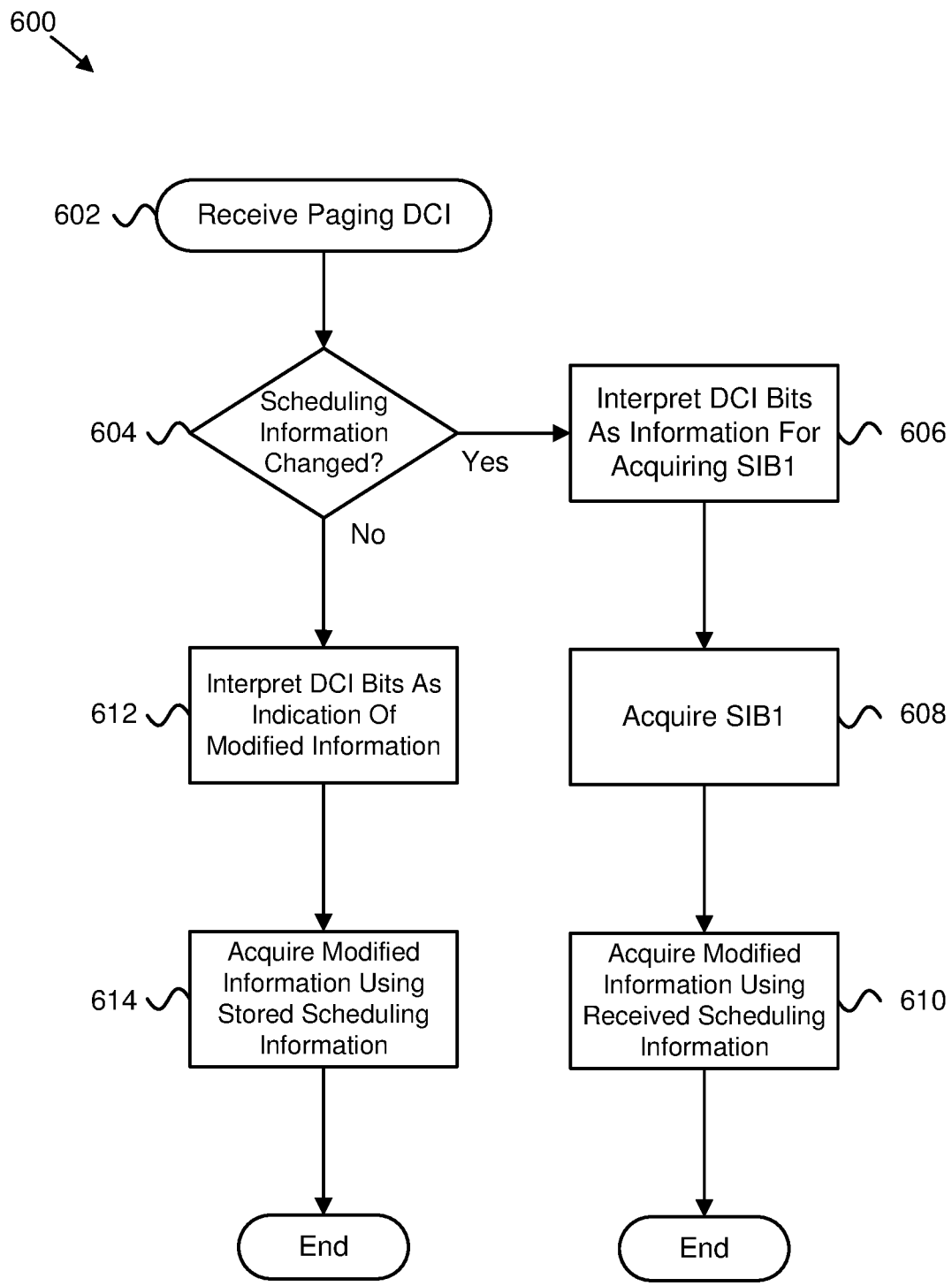
FIG. 6 is a flow chart diagram illustrating one embodiment of a method for processing information that indicates a change in system information.

FIG. 6 is a flow chart diagram illustrating one embodiment of a method 600 for processing information that indicates a change in system information. The method 600 begins with receiving 602 paging DCI. The method 600 then determines 604 whether scheduling information has changed. If the scheduling information has changed, the method 600 interprets 606 remaining bits in the paging DCI as MIB information necessary to acquire SIB1. The method 600 then acquires 608 SIB1. Moreover, the method 600 acquires 610 modified SIBs or SI-messages of interest using received updated scheduling information, then the method 600 ends. If the scheduling information has not changed, the method 600 interprets 612 remaining bits in the paging DCI as a bitmap indication that indicates which SIBs or SI-messages are modified. The method 600 then acquires 614 modified SIBs or SI-messages of interest using the stored scheduling information, then the method 600 ends.

In various embodiments, a single bit that in DCI may be used for all warning messages (e.g., such as CMAS, ETWS, etc.). In such embodiments, the single bit may also be used to indicate if some other non-warning but urgent system information (e.g., cell access, cell barring, etc.) is available or has been updated, and the UE may immediately acquire the warning messages (or the other urgent SI) after this indication. In some embodiments, the single bit may be called an "immediate" or "generic" change indicator. In one embodiment, detailed UE behavior may be based on any embodiment described herein.

Figure 7:
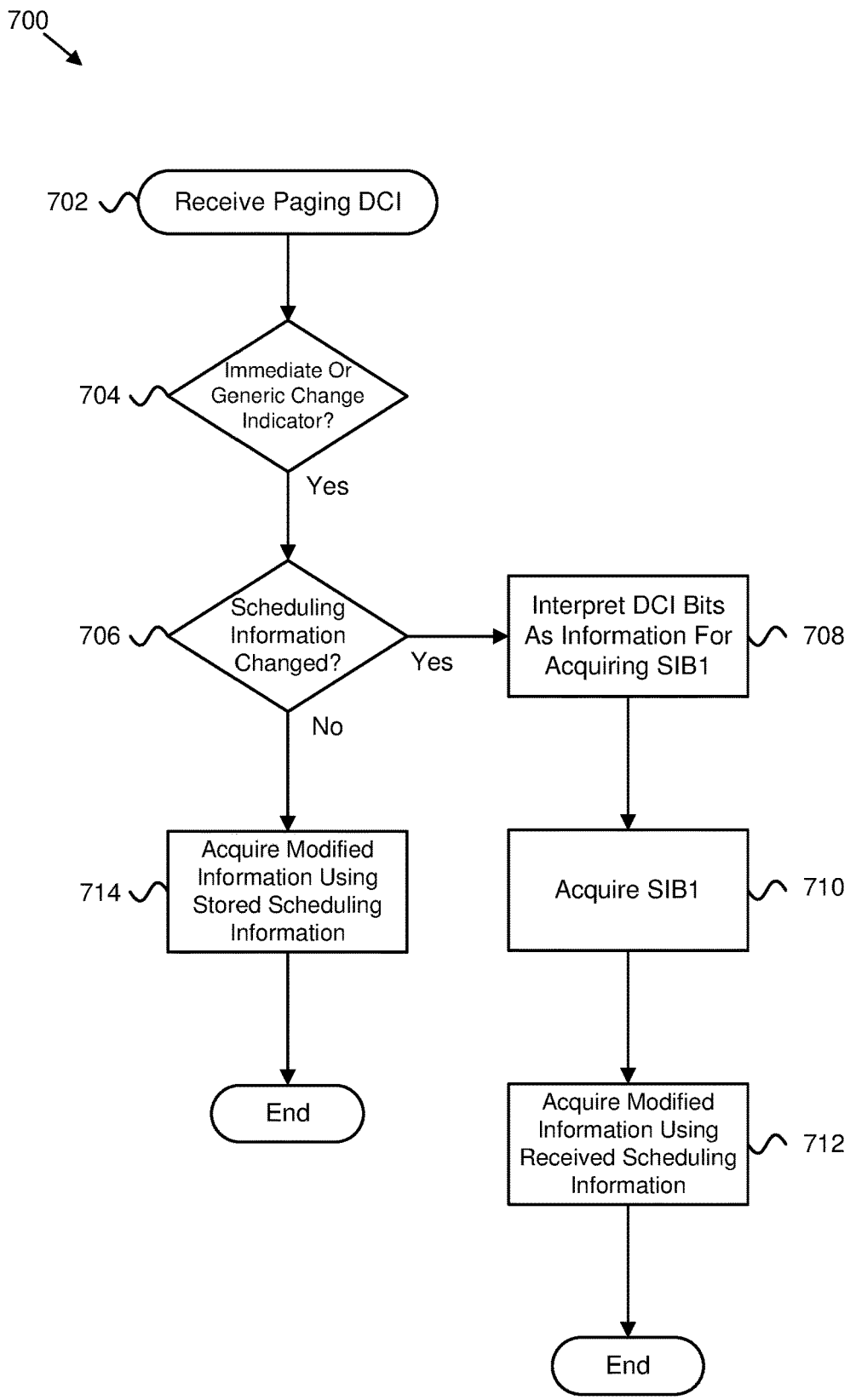
FIG. 7 is a flow chart diagram illustrating another embodiment of a method for processing information that indicates a change in system information.

FIG. 7 is a flow chart diagram illustrating another embodiment of a method 700 for processing information that indicates a change in system information. The method 700 begins with receiving 702 paging DCI. Next, the method 700 determines 704 whether there is an immediate or generic change indicator. If there is an immediate or generic change indicator, the method 700 then determines 706 whether scheduling information has changed. If the scheduling information has changed, the method 700 interprets 708 remaining bits in the paging DCI as MIB information necessary to acquire SIB1. The method 700 then acquires 710 SIB1. Moreover, the method 700 acquires 712 modified SIBs or SI-messages corresponding to the immediate or generic change indicator using received updated scheduling information, then the method 700 ends. If the scheduling information has not changed, the method 700 acquires 714 modified SIBs or SI-messages corresponding to the immediate or generic change indicator using the stored scheduling information, then the method 700 ends.

In some embodiments, a short message field in paging DCI (or other indicator) may include cellBarred and/or intraFreqReselection information from MIB (e.g., described in TS 38.331). In such embodiments, the radio network (e.g., a gNB) may be enabled to immediately bar a cell, turn on an intra-frequency reselection, and/or turn off an intra-frequency reselection without waiting until the start of a next modification boundary. In certain embodiments, barring may only apply to a specific set of UEs such as particular access classes or particular establishment causes and a barring timer may apply. In such embodiments, the particular access classes or particular establishment causes and the corresponding barring timer may be configurable in system information or may be specified.

In any embodiments described herein, a Boolean variable or a flag described herein for a particular parameter (e.g., scheduling-Info-changed) may have been described in relation to values such as "TRUE=1" or "FALSE=0." As may be appreciated, a different parameter may described the other way round so "TRUE=0" or "FALSE=1" instead of "TRUE=1" or "FALSE=0" (e.g., using a different name for a such a 'scheduling-Info-unchanged').

In various embodiments, MIB is always transmitted on BCCH with a periodicity of 80 ms, repetitions are made within 80 ms, and the MIB includes parameters that are needed to acquire SIB1 from a cell. In such embodiments, SIB1 is transmitted on DL-SCH with variable periodicity and repetitions are made within 160 ms. In some embodiments, the UE stores MIB and SIB1 upon acquisition.

In certain embodiment, a UE attempts to find a system information modification indication over a certain interval during a modification period if no paging is received and/or a UE checks value tags for each SIB that the UE is interested in.

Figure 8:
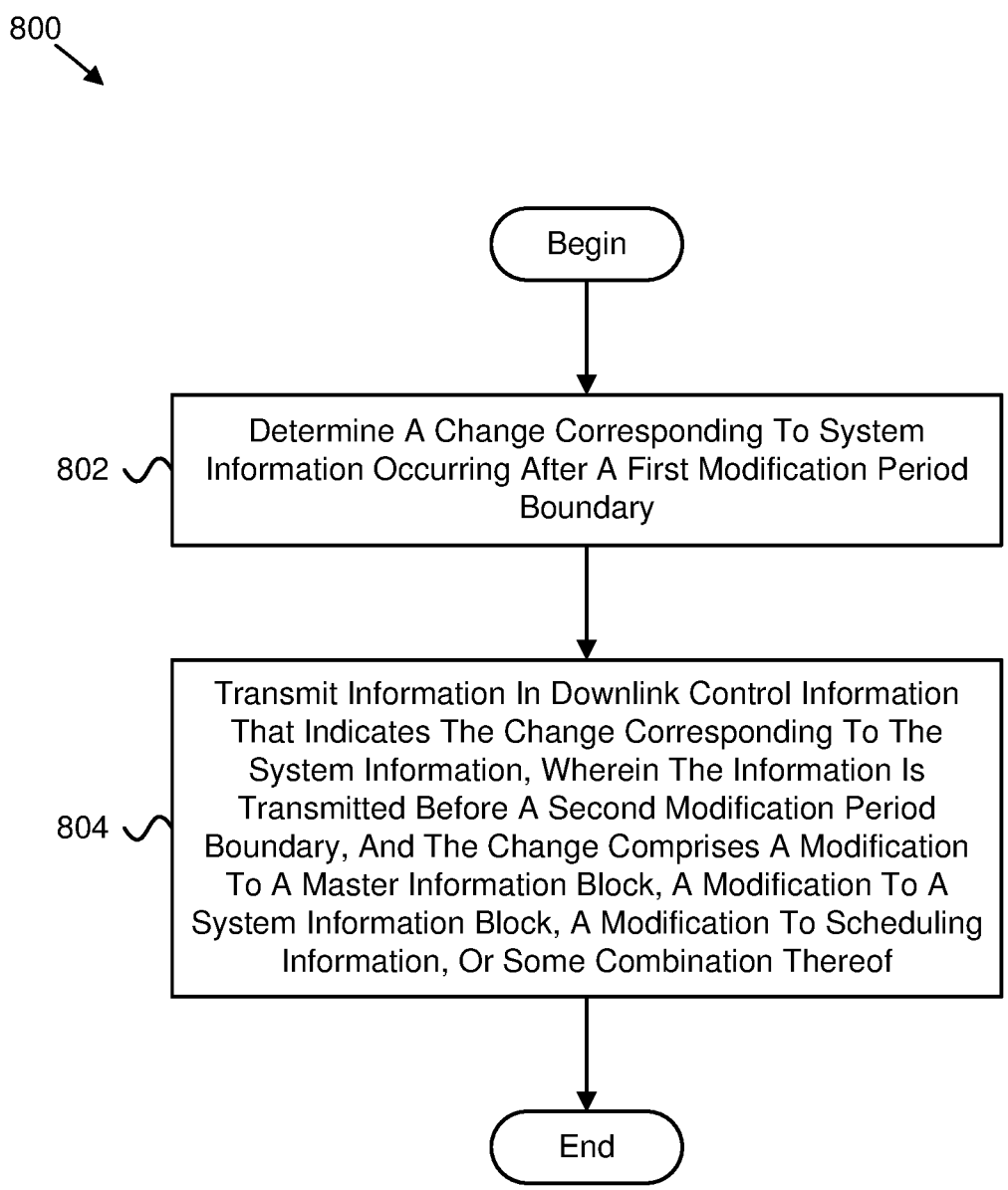
FIG. 8 is a flow chart diagram illustrating one embodiment of a method for transmitting information that indicates a change in system information.

FIG. 8 is a flow chart diagram illustrating one embodiment of a method 800 for transmitting information that indicates a change in system information. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

The method 800 may include determining 802 a change corresponding to system information occurring after a first modification period boundary. In certain embodiments, the method 800 includes transmitting 804 information in downlink control information that indicates the change corresponding to the system information. In such embodiments, the information is transmitted before a second modification period boundary, and the change comprises a modification to a master information block, a modification to a system information block, a modification to scheduling information, or some combination thereof.

In certain embodiments, the information is at least part of a short message. In some embodiments, the information indicates whether the master information block has been modified since the first modification period boundary. In various embodiments, the information comprises a 1-bit indicator that indicates whether the master information block has been modified since the first modification period boundary.

In one embodiment, the information indicates whether the system information block has been modified since the first modification period boundary. In certain embodiments, the information comprises a 1-bit indicator that indicates whether the system information block has been modified since the first modification period boundary. In some embodiments, the information indicates whether the scheduling information has been modified since the first modification period boundary.

In various embodiments, the information comprises a 1-bit indicator that indicates whether the scheduling information has been modified since the first modification period boundary. In one embodiment, the scheduling information is part of the system information block. In certain embodiments, the information indicates whether the system information block or a system information message is to be modified.

In some embodiments, the information indicates a value tag corresponding to the system information block or a system information message. In various embodiments, the information indicates which system information block is updated or which system information message is updated. In one embodiment, the information comprises a bitmap, and each bit of the bitmap corresponds to a system information block that is updated or a system information message that is updated.

In certain embodiments, the information indicates part of the master information block used for acquiring the system information block. In some embodiments, the information comprises a subcarrier spacing, a demodulation reference signal position, a subcarrier offset, a physical downlink control channel configuration, or some combination thereof. In various embodiments, the information indicates: whether the master information block has been modified since the first modification period boundary; whether the system information block has been modified since the first modification period boundary; whether the scheduling information has been modified since the first modification period boundary; a value tag corresponding to the system information block or a system information message; the system information block that is updated or a system information message that is updated; part of the master information block used for acquiring the system information block; or some combination thereof.

In one embodiment, in response to the scheduling information being changed since the first modification period boundary, the information indicates part of the master information block used for acquiring the system information block; and in response to the scheduling information not being changed since the first modification period boundary, the information indicates the system information block that is updated or a system information message that is updated. In certain embodiments, the information comprises an immediate change indicator.

In some embodiments, in response to the scheduling information being changed since the first modification period boundary, the information further indicates part of the master information block used for acquiring the system information block; and in response to the scheduling information not being changed since the first modification period boundary, the information further indicates the system information block corresponding to the immediate change indicator, a system information message corresponding to the immediate change indicator, or a combination thereof. In various embodiments, information comprises a barred cell indicator, an intra frequency reselection indicator, or a combination thereof.

Figure 9:
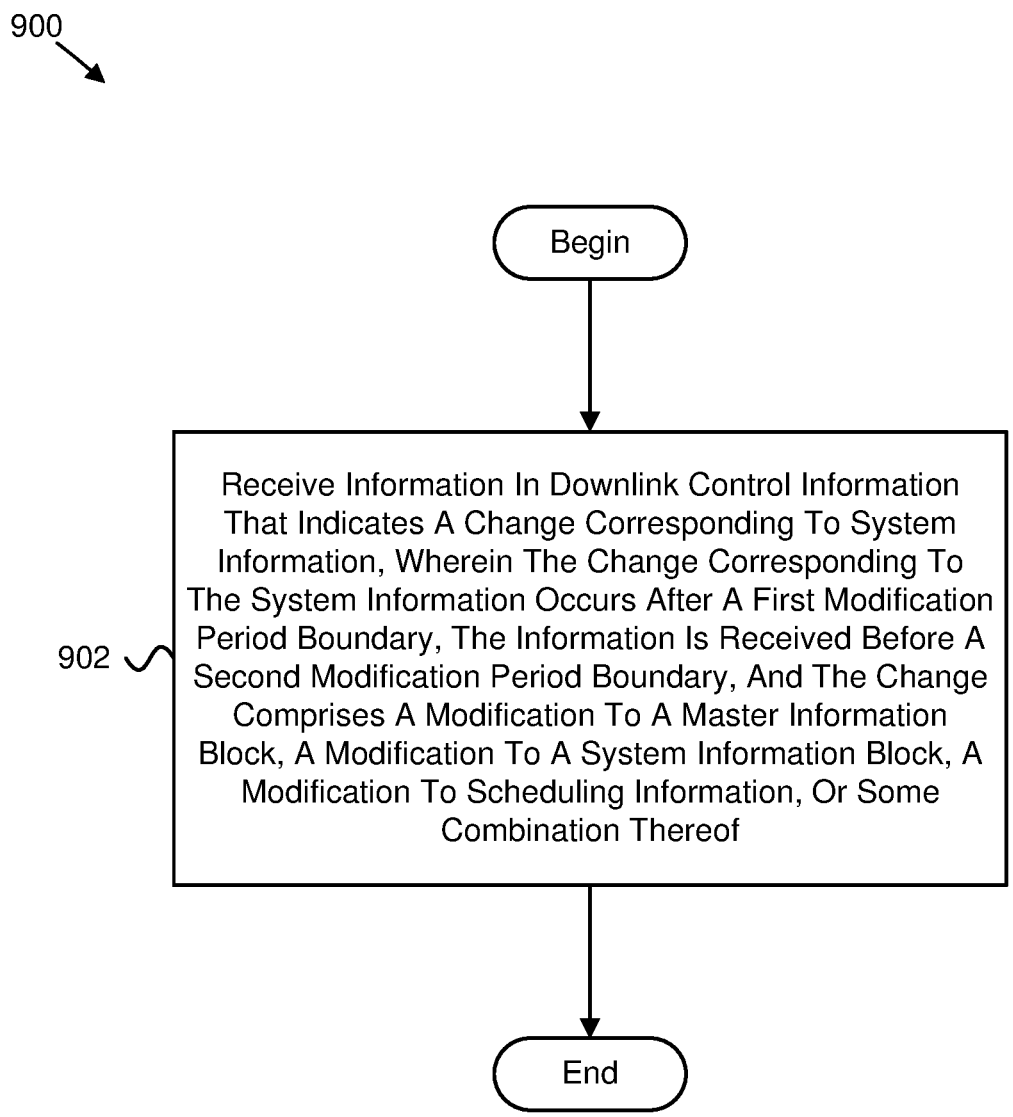
FIG. 9 is a flow chart diagram illustrating one embodiment of a method for receiving information that indicates a change in system information.

FIG. 9 is a flow chart diagram illustrating one embodiment of a method 900 for receiving information that indicates a change in system information. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902 information in downlink control information that indicates a change corresponding to system information. In such an embodiment, the change corresponding to the system information occurs after a first modification period boundary, the information is received before a second modification period boundary, and the change comprises a modification to a master information block, a modification to a system information block, a modification to scheduling information, or some combination thereof.

In certain embodiments, the information is at least part of a short message. In some embodiments, the information indicates whether the master information block has been modified since the first modification period boundary. In various embodiments, the information comprises a 1-bit indicator that indicates whether the master information block has been modified since the first modification period boundary.

In one embodiment, the information indicates whether the system information block has been modified since the first modification period boundary. In certain embodiments, the information comprises a 1-bit indicator that indicates whether the system information block has been modified since the first modification period boundary.

In some embodiments, the information indicates whether the scheduling information has been modified since the first modification period boundary. In various embodiments, the information comprises a 1-bit indicator that indicates whether the scheduling information has been modified since the first modification period boundary. In one embodiment, the scheduling information is part of the system information block.

In certain embodiments, the information indicates whether the system information block or a system information message is to be modified. In some embodiments, the information indicates a value tag corresponding to the system information block or a system information message. In various embodiments, the information indicates which system information block is updated or which system information message is updated.

In one embodiment, the information comprises a bitmap, and each bit of the bitmap corresponds to a system information block that is updated or a system information message that is updated. In certain embodiments, the information indicates part of the master information block used for acquiring the system information block. In some embodiments, the information comprises a subcarrier spacing, a demodulation reference signal position, a subcarrier offset, a physical downlink control channel configuration, or some combination thereof.

In various embodiments, the information indicates: whether the master information block has been modified since the first modification period boundary; whether the system information block has been modified since the first modification period boundary; whether the scheduling information has been modified since the first modification period boundary; a value tag corresponding to the system information block or a system information message; the system information block that is updated or a system information message that is updated; part of the master information block used for acquiring the system information block; or some combination thereof.

In one embodiment, in response to the scheduling information being changed since the first modification period boundary, the information indicates part of the master information block used for acquiring the system information block; and in response to the scheduling information not being changed since the first modification period boundary, the information indicates the system information block that is updated or a system information message that is updated. In certain embodiments, the information comprises an immediate change indicator.

In some embodiments, in response to the scheduling information being changed since the first modification period boundary, the information further indicates part of the master information block used for acquiring the system information block; and in response to the scheduling information not being changed since the first modification period boundary, the information further indicates the system information block corresponding to the immediate change indicator, a system information message corresponding to the immediate change indicator, or a combination thereof. In various embodiments, the information comprises a barred cell indicator, an intra frequency reselection indicator, or a combination thereof.

In one embodiment, a method comprising: determining a change corresponding to system information occurring after a first modification period boundary; and transmitting information in downlink control information that indicates the change corresponding to the system information, wherein the information is transmitted before a second modification period boundary, and the change comprises a modification to a master information block, a modification to a system information block, a modification to scheduling information, or some combination thereof.

In certain embodiments, the information is at least part of a short message.

In some embodiments, the information indicates whether the master information block has been modified since the first modification period boundary.

In various embodiments, the information comprises a 1-bit indicator that indicates whether the master information block has been modified since the first modification period boundary.

In one embodiment, the information indicates whether the system information block (e.g., any SIB) has been modified since the first modification period boundary.

In certain embodiments, the information comprises a 1-bit indicator that indicates whether the system information block (e.g., any SIB) has been modified since the first modification period boundary.

In some embodiments, the information indicates whether the scheduling information (e.g., in SIB1) has been modified since the first modification period boundary.

In various embodiments, the information comprises a 1-bit indicator that indicates whether the scheduling information (e.g., in SIB1) has been modified since the first modification period boundary.

In one embodiment, the scheduling information is part of the system information block (e.g., SIB1).

In certain embodiments, the information indicates whether the system information block (e.g., any SIB) or a system information message is to be modified.

In some embodiments, the information indicates a value tag corresponding to the system information block (e.g., any SIB) or a system information message.

In various embodiments, the information indicates which system information block is updated or which system information message is updated.

In one embodiment, the information comprises a bitmap, and each bit of the bitmap corresponds to a system information block that is updated or a system information message that is updated.

In certain embodiments, the information indicates part of the master information block used for acquiring the system information block.

In some embodiments, the information comprises a subcarrier spacing, a demodulation reference signal position, a subcarrier offset, a physical downlink control channel configuration, or some combination thereof.

In various embodiments, the information indicates: whether the master information block has been modified since the first modification period boundary; whether the system information block (e.g., any SIB) has been modified since the first modification period boundary; whether the scheduling information has been modified since the first modification period boundary; a value tag corresponding to the system information block or a system information message; the system information block that is updated or a system information message that is updated; part of the master information block used for acquiring the system information block; or some combination thereof.

In one embodiment, in response to the scheduling information (e.g., for receiving SIB1) being changed since the first modification period boundary, the information indicates part of the master information block used for acquiring the system information block; and in response to the scheduling information not being changed since the first modification period boundary, the information indicates the system information block that is updated or a system information message that is updated.

In certain embodiments, the information comprises an immediate change indicator.

In some embodiments, in response to the scheduling information (e.g., for receiving SIB1) being changed since the first modification period boundary, the information further indicates part of the master information block used for acquiring the system information block; and in response to the scheduling information not being changed since the first modification period boundary, the information further indicates the system information block corresponding to the immediate change indicator, a system information message corresponding to the immediate change indicator, or a combination thereof.

In various embodiments, information comprises a barred cell indicator, an intra frequency reselection indicator, or a combination thereof.

In one embodiment, an apparatus comprises: a processor that determines a change corresponding to system information occurring after a first modification period boundary; and a transmitter that transmits information in downlink control information that indicates the change corresponding to the system information, wherein the information is transmitted before a second modification period boundary, and the change comprises a modification to a master information block, a modification to a system information block, a modification to scheduling information, or some combination thereof.

In certain embodiments, the information is at least part of a short message.

In some embodiments, the information indicates whether the master information block has been modified since the first modification period boundary.

In various embodiments, the information comprises a 1-bit indicator that indicates whether the master information block has been modified since the first modification period boundary.

In one embodiment, the information indicates whether the system information block (e.g., any SIB) has been modified since the first modification period boundary.

In certain embodiments, the information comprises a 1-bit indicator that indicates whether the system information block (e.g., any SIB) has been modified since the first modification period boundary.

In some embodiments, the information indicates whether the scheduling information (e.g., in SIB1) has been modified since the first modification period boundary.

In various embodiments, the information comprises a 1-bit indicator that indicates whether the scheduling information (e.g., in SIB1) has been modified since the first modification period boundary.

In one embodiment, the scheduling information is part of the system information block (e.g., SIB1).

In certain embodiments, the information indicates whether the system information block (e.g., any SIB) or a system information message is to be modified.

In some embodiments, the information indicates a value tag corresponding to the system information block (e.g., any SIB) or a system information message.

In various embodiments, the information indicates which system information block is updated or which system information message is updated.

In one embodiment, the information comprises a bitmap, and each bit of the bitmap corresponds to a system information block that is updated or a system information message that is updated.

In certain embodiments, the information indicates part of the master information block used for acquiring the system information block.

In some embodiments, the information comprises a subcarrier spacing, a demodulation reference signal position, a subcarrier offset, a physical downlink control channel configuration, or some combination thereof.

In various embodiments, the information indicates: whether the master information block has been modified since the first modification period boundary; whether the system information block (e.g., any SIB) has been modified since the first modification period boundary; whether the scheduling information has been modified since the first modification period boundary; a value tag corresponding to the system information block or a system information message; the system information block that is updated or a system information message that is updated; part of the master information block used for acquiring the system information block; or some combination thereof.

In one embodiment, in response to the scheduling information (e.g., for receiving SIB1) being changed since the first modification period boundary, the information indicates part of the master information block used for acquiring the system information block; and in response to the scheduling information not being changed since the first modification period boundary, the information indicates the system information block that is updated or a system information message that is updated.

In certain embodiments, the information comprises an immediate change indicator.

In some embodiments, in response to the scheduling information (e.g., for receiving SIB1) being changed since the first modification period boundary, the information further indicates part of the master information block used for acquiring the system information block; and in response to the scheduling information not being changed since the first modification period boundary, the information further indicates the system information block corresponding to the immediate change indicator, a system information message corresponding to the immediate change indicator, or a combination thereof.

In various embodiments, the information comprises a barred cell indicator, an intra frequency reselection indicator, or a combination thereof.

In one embodiment, a method comprises: receiving information in downlink control information that indicates a change corresponding to system information, wherein the change corresponding to the system information occurs after a first modification period boundary, the information is received before a second modification period boundary, and the change comprises a modification to a master information block, a modification to a system information block, a modification to scheduling information, or some combination thereof.

In certain embodiments, the information is at least part of a short message.

In some embodiments, the information indicates whether the master information block has been modified since the first modification period boundary.

In various embodiments, the information comprises a 1-bit indicator that indicates whether the master information block has been modified since the first modification period boundary.

In one embodiment, the information indicates whether the system information block (e.g., any SIB) has been modified since the first modification period boundary.

In certain embodiments, the information comprises a 1-bit indicator that indicates whether the system information block (e.g., any SIB) has been modified since the first modification period boundary.

In some embodiments, the information indicates whether the scheduling information (e.g., in SIB1) has been modified since the first modification period boundary.

In various embodiments, the information comprises a 1-bit indicator that indicates whether the scheduling information (e.g., in SIB1) has been modified since the first modification period boundary.

In one embodiment, the scheduling information is part of the system information block (e.g., SIB1).

In certain embodiments, the information indicates whether the system information block (e.g., any SIB) or a system information message is to be modified.

In some embodiments, the information indicates a value tag corresponding to the system information block (e.g., any SIB) or a system information message.

In various embodiments, the information indicates which system information block is updated or which system information message is updated.

In one embodiment, the information comprises a bitmap, and each bit of the bitmap corresponds to a system information block that is updated or a system information message that is updated.

In certain embodiments, the information indicates part of the master information block used for acquiring the system information block.

In some embodiments, the information comprises a subcarrier spacing, a demodulation reference signal position, a subcarrier offset, a physical downlink control channel configuration, or some combination thereof.

In various embodiments, the information indicates: whether the master information block has been modified since the first modification period boundary; whether the system information block (e.g., any SIB) has been modified since the first modification period boundary; whether the scheduling information has been modified since the first modification period boundary; a value tag corresponding to the system information block or a system information message; the system information block that is updated or a system information message that is updated; part of the master information block used for acquiring the system information block; or some combination thereof.

In one embodiment, in response to the scheduling information (e.g., for receiving SIB1) being changed since the first modification period boundary, the information indicates part of the master information block used for acquiring the system information block; and in response to the scheduling information not being changed since the first modification period boundary, the information indicates the system information block that is updated or a system information message that is updated.

In certain embodiments, the information comprises an immediate change indicator.

In some embodiments, in response to the scheduling information (e.g., for receiving SIB1) being changed since the first modification period boundary, the information further indicates part of the master information block used for acquiring the system information block; and in response to the scheduling information not being changed since the first modification period boundary, the information further indicates the system information block corresponding to the immediate change indicator, a system information message corresponding to the immediate change indicator, or a combination thereof.

In various embodiments, the information comprises a barred cell indicator, an intra frequency reselection indicator, or a combination thereof.

In one embodiment, an apparatus comprises: a receiver that receives information in downlink control information that indicates a change corresponding to system information, wherein the change corresponding to the system information occurs after a first modification period boundary, the information is received before a second modification period boundary, and the change comprises a modification to a master information block, a modification to a system information block, a modification to scheduling information, or some combination thereof.

In certain embodiments, the information is at least part of a short message.

In some embodiments, the information indicates whether the master information block has been modified since the first modification period boundary.

In various embodiments, the information comprises a 1-bit indicator that indicates whether the master information block has been modified since the first modification period boundary.

In one embodiment, the information indicates whether the system information block (e.g., any SIB) has been modified since the first modification period boundary.

In certain embodiments, the information comprises a 1-bit indicator that indicates whether the system information block (e.g., any SIB) has been modified since the first modification period boundary.

In some embodiments, the information indicates whether the scheduling information (e.g., in SIB1) has been modified since the first modification period boundary.

In various embodiments, the information comprises a 1-bit indicator that indicates whether the scheduling information (e.g., in SIB1) has been modified since the first modification period boundary.

In one embodiment, the scheduling information is part of the system information block (e.g., SIB1).

In certain embodiments, the information indicates whether the system information block (e.g., any SIB) or a system information message is to be modified.

In some embodiments, the information indicates a value tag corresponding to the system information block (e.g., any SIB) or a system information message.

In various embodiments, the information indicates which system information block is updated or which system information message is updated.

In one embodiment, the information comprises a bitmap, and each bit of the bitmap corresponds to a system information block that is updated or a system information message that is updated.

In certain embodiments, the information indicates part of the master information block used for acquiring the system information block.

In some embodiments, the information comprises a subcarrier spacing, a demodulation reference signal position, a subcarrier offset, a physical downlink control channel configuration, or some combination thereof.

In various embodiments, the information indicates: whether the master information block has been modified since the first modification period boundary; whether the system information block (e.g., any SIB) has been modified since the first modification period boundary; whether the scheduling information has been modified since the first modification period boundary; a value tag corresponding to the system information block or a system information message; the system information block that is updated or a system information message that is updated; part of the master information block used for acquiring the system information block; or some combination thereof.

In one embodiment, in response to the scheduling information (e.g., for receiving SIB1) being changed since the first modification period boundary, the information indicates part of the master information block used for acquiring the system information block; and in response to the scheduling information not being changed since the first modification period boundary, the information indicates the system information block that is updated or a system information message that is updated.

In certain embodiments, the information comprises an immediate change indicator.

In some embodiments, in response to the scheduling information (e.g., for receiving SIB1) being changed since the first modification period boundary, the information further indicates part of the master information block used for acquiring the system information block; and in response to the scheduling information not being changed since the first modification period boundary, the information further indicates the system information block corresponding to the immediate change indicator, a system information message corresponding to the immediate change indicator, or a combination thereof.

In various embodiments, the information comprises a barred cell indicator, an intra frequency reselection indicator, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for wireless communication comprising a network entity, the apparatus further comprising:
a transmitter that:
transmits, to a user equipment (UE), a downlink control information (DCI) based in part on a change to system information after a first temporal boundary and before a second temporal boundary, wherein the DCI comprises a short message indication, the DCI comprises predetermined fields that include a short message field and excludes a paging information field associated with a paging message based in part on the short message indication, the short message field indicates the change to the system information, and the change to the system information occurs during a duration between the first temporal boundary and the second temporal boundary; or
transmits, to the UE, the DCI based at least in part on the change to the system information after the first temporal boundary and before the second temporal boundary, wherein the DCI comprises the predetermined fields that include the short message indication, and the DCI excludes the short message field and includes the paging information field associated with the paging message based at least in part on the short message indication.

2. The apparatus of claim 1, wherein the DCI indicates whether a master information block has been modified since the first temporal boundary.

3. The apparatus of claim 2, wherein the DCI comprises a 1-bit indicator that indicates whether the master information block has been modified since the first temporal boundary.

4. The apparatus of claim 1, wherein the DCI indicates whether a system information block has been modified since the first temporal boundary.

5. The apparatus of claim 4, wherein the DCI comprises a 1-bit indicator that indicates whether the system information block has been modified since the first temporal boundary.

6. The apparatus of claim 1, wherein the DCI indicates whether scheduling information has been modified since the first temporal boundary.

7. The apparatus of claim 6, wherein the DCI comprises a 1-bit indicator that indicates whether the scheduling information has been modified since the first temporal boundary, and the scheduling information is part of a system information block.

8. The apparatus of claim 1, wherein the DCI indicates whether a system information block or a system information message is to be modified.

9. The apparatus of claim 1, wherein the DCI indicates a value tag corresponding to a system information block or a system information message.

10. The apparatus of claim 1, wherein the DCI indicates which system information block is updated or which system information message is updated.

11. The apparatus of claim 1, wherein the DCI comprises a bitmap, and each bit of the bitmap corresponds to a system information block that is updated or a system information message that is updated.

12. The apparatus of claim 1, wherein the DCI indicates part of a master information block used for acquiring a system information block.

13. The apparatus of claim 1, wherein the DCI comprises a subcarrier spacing, a demodulation reference signal position, a subcarrier offset, a physical downlink control channel configuration, or some combination thereof.

14. The apparatus of claim 1, wherein the DCI indicates:
whether a master information block has been modified since the first temporal boundary;
whether a system information block has been modified since the first temporal boundary;
whether scheduling information has been modified since the first temporal boundary;
a value tag corresponding to the system information block or a system information message;
the system information block that is updated or the system information message that is updated;
part of the master information block used for acquiring the system information block; or
some combination thereof.

15. The apparatus of claim 1, wherein:
in response to scheduling information being changed since the first temporal boundary, the DCI indicates part of a master information block used for acquiring a system information block; and
in response to the scheduling information not being changed since the first temporal boundary, the DCI indicates the system information block that is updated or a system information message that is updated.

16. The apparatus of claim 1, wherein the DCI comprises an immediate change indicator.

17. The apparatus of claim 16, wherein:
in response to scheduling information being changed since the first temporal boundary, the DCI further indicates part of a master information block used for acquiring a system information block; and
in response to the scheduling information not being changed since the first temporal boundary, the DCI further indicates the system information block corresponding to the immediate change indicator, a system information message corresponding to the immediate change indicator, or a combination thereof.

18. The apparatus of claim 1, wherein the DCI comprises a barred cell indicator, an intra frequency reselection indicator, or a combination thereof.

19. A method of wireless communication at a network entity, the method comprising:
transmitting, to a user equipment (UE), a downlink control information (DCI) based in part on a change to system information after a first temporal boundary and before a second temporal boundary, wherein the DCI comprises a short message indication, the DCI comprises predetermined fields that include a short message field and excludes a paging information field associated with a paging message based in part on the short message indication, the short message field indicates the change to the system information, and the change to the system information occurs during a duration between the first temporal boundary and the second temporal boundary; or
transmitting, to the UE, the DCI based at least in part on the change to the system information after the first temporal boundary and before the second temporal boundary, wherein the DCI comprises the predetermined fields that include the short message indication, and the DCI excludes the short message field and includes the paging information field associated with the paging message based at least in part on the short message indication.

20. An apparatus for wireless communication comprising a user equipment (UE), the apparatus further comprising:
a receiver that:
receives, from a network entity, a downlink control information (DCI) based in part on a change to system information after a first temporal boundary and before a second temporal boundary, wherein the DCI comprises a short message indication, the DCI comprises predetermined fields that include a short message field and excludes a paging information field associated with a paging message based in part on the short message indication, the short message field indicates the change to the system information, and the change to the system information occurs during a duration between the first temporal boundary and the second temporal boundary; or
receives, from the network entity, the DCI based at least in part on the change to the system information after the first temporal boundary and before the second temporal boundary, wherein the DCI comprises the predetermined fields that include the short message indication, and the DCI excludes the short message field and includes the paging information field associated with the paging message based at least in part on the short message indication.

* * * * *